G. AKERLUND.
GAS PRODUCER SYSTEM.
APPLICATION FILED MAR. 30, 1910.
992,840.
Patented May 23, 1911.
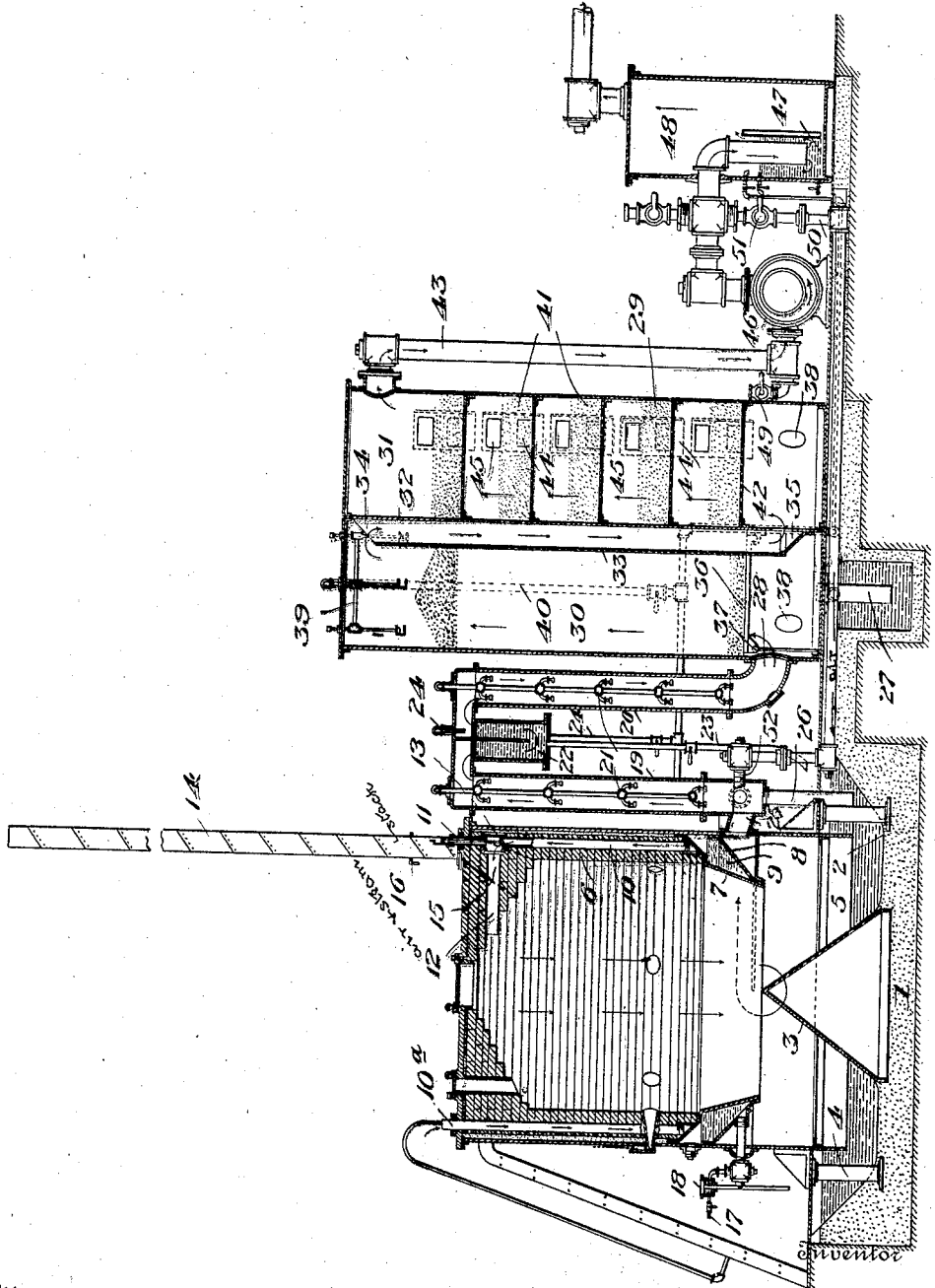

UNITED STATES PATENT OFFICE.

GUSTAF AKERLUND, OF ATLANTA, GEORGIA, ASSIGNOR TO THE GIBBS GAS ENGINE COMPANY, OF ATLANTA, GEORGIA, A CORPORATION OF GEORGIA.

GAS-PRODUCER SYSTEM.

992,840.    Specification of Letters Patent.    Patented May 23, 1911.

Application filed March 30, 1910. Serial No. 552,304.

*To all whom it may concern:*

Be it known that I, GUSTAF AKERLUND, a subject of the King of Sweden, residing at Atlanta, county of Fulton, and State of Georgia, have invented certain new and useful Improvements in Gas-Producer Systems, of which the following is a specification.

This invention relates to gas producer systems.

The present invention has for its object the provision of a complete gas producer system comprising a generator, gas cooler, scrubber, purifier, exhauster and tank, all of novel construction and arranged and adapted for conjoint use to produce, cool, clean, purify and store gas for use at any point.

The generator, which is of the water-seal, conical ash pier type, embodies a novel arrangement of its shell in the water-pit so that all of the metal parts are protected by the seal, an ash-pier arranged in the pit in such fashion that building up of the clinkers at the center is obviated and the breaking up of the clinkers and removal of the ashes through the water-pit is facilitated, a novel arrangement of the vaporizer and supply of water thereto, rendering the water level always constant, a new arrangement of vapor distributer with controlling valve so that the vapor supply can be regulated, and a new air intake.

The gas cooler is constructed so that it may be cut off from the remaining units of the system and embodies independent compartments with water sprays, said compartments each having its own direct drain, water-sealed so that the impurities washed out of the gas readily drain off without necessitating operation of any valves, and, a water-sealed valve connecting the compartments which has filling and draining connections and means for regulation of the water level.

The scrubber and purifier combines separate compartments or chambers and a gas duct or trunk so arranged that the heat which is radiated from the purifier is absorbed by the water sprays in the scrubber, and thus the purifier is kept comparatively cool and effects a further cooling of the gas after it leaves the scrubber and enters the purifier. The scrubber has a grate constructed and arranged in a novel manner permitting easy renewal of the coke, and the purifier has cleaning and filling doors disposed adjacent the trays in a new manner so that one can be used for cleaning and the other for filling any given compartment.

The system contemplates the use of an exhauster, and various adjuncts, whereby the draft in the generator can be reversed from downward to upward without stopping or reversing the exhauster.

The accompanying drawing is a longitudinal section through the complete system.

*The generator.*—The entire system or plant is preferably supported on a suitable concrete or other foundation 1 and at the point where the generator is located this is provided with a water-pit 2 preferably of circular form, and rising centrally thereof is the conical ash-pier 3. The generator is supported on pillars 4, the lower metallic part 5 of the generator, which is in the form of a shell, being immersed in the water in the pit 2 so that it is always protected against the heat and the seal is sufficiently deep to prevent the exhaust or suction of the system from breaking the seal at this point. The generator 6 may be of any preferred form with filling opening, twyers, and other adjuncts, but the lower part thereof is provided with a tapering shell 7 which is surrounded by a circular shell 8, the two being designed to form an annular channel containing water. Air is introduced into space above surface of the water and preheated during its course through one or more induction pipes $10^a$, open to atmosphere at one end; the preheated air thus introduced mixes with vapor rising from the water and arises through one or more pipes 10 so that the air and vapor may mix and be fed to the generator 6 by the mixture intake 12; this mixture is superheated during passage through pipe 10. To control and regulate the amount of mixture, I provide an adjustable valve 13. There is also provided a stack 14 which communicates with a duct 15, whereby air may be let into the generator, and this in turn, may be controlled by a damper 16 in the stack 14 so that any desired regulation may be obtained. The stack acts also as a vent for waste gases during periods when the plant is dormant.

The vaporizer is fed with water entering through valved pipe 17 which is provided with an over-flow regulator 18, by which the level of the water in the vaporizer is always maintained at the same height. The pipe coupling has a removable plug by which the draining of the vaporizer can be readily effected, and by any desired adjustment of the over-flow pipe, the water level in the vaporizer can be changed as desired.

The cooler is preferably composed of two upright tubular compartments 19 and 20, each having a series of sprays 21 arranged vertically in succession, the two compartments being connected by a cooler water-trap valve 22 which may be drained by a valved pipe 23 leading from the bottom thereof and suitably filled by a valve pipe 24 leading to the top thereof. The water-trap cooler valve 22 is normally empty and open for the passage of the gas, but when the producer is dormant, this valve is filled with water to cut the generator off from the rest of the system. The gas produced by the generator passes into the cooler via a trunk 25, whence it rises, is cooled by the sprinklers 21, then dives through the water-trap cooler valve 22 and finally passes into the compartment 20 for its next sprinkling.

The compartment 19 has a direct drain 26, by which the impurities washed out of the gas are gravitally carried off without requiring the operation of any valve, and this drain is sealed by the water in the pit 2, or otherwise. The compartment 20 has a similar water-sealed drain 27 which also serves as a drain for the scrubber to which the cooler connects at 28.

The scrubber and purifier are contained in the same shell 29, the scrubber compartment being shown at 30 and the purifier at 31, the two being separated by a partition 32, on which is formed a diving duct or trunk 33, which opens into the upper part of the scrubber at 34 and into the lower part of the purifier at 35. The coke in the scrubber is supported on a grate 36 which is hinged at 37 and is adapted to swing downwardly to deliver the coke to the inspection doors 38, thus rendering easy the renewal of the coke. In the upper part of the scrubber is a sprinkler 39 to keep the coke moist, the sprinkler being controlled by a suitable valved pipe 40. The impurities washed out of the gas by the scrubber drain down through the pipe 27. The gas which enters the scrubber through the opening 28, passes upwardly through the coke, is cleansed and cooled and then dives down the trunk or duct 33 and passes into the lower part of the purifier at 35, whence it rises through the various beds or strata 41, supported by screens 42 and finally passes into the pipe 43. On a level with each of the beds or strata 41 is a cleaning door 44, and just above the bed is a filling door 45, thus affording a convenient arrangement for cleaning and filling each compartment of the purifier. The heat radiated through the partition 32 is absorbed by the water spray and the coke in the scrubber, thus rendering it possible to still further cool the gas after it enters the purifier.

*The exhauster and accessories.*—The exhauster 46 is connected to the pipe 43 and by suction draws the gas through the system, delivering it into the water-sealed valve 47, whence it issues into the expansion tank 48, from which the gas is taken to the pipe line.

*Reversal of draft.*—To provide for a reversal of the draft without necessitating stoppage or reversal of the exhauster, there is provided an air inlet valve 49, which is only opened when the draft is to be reversed, being at other times closed, and an up-draft air pipe 50 having suitable controlling valve 51 which is only opened when the draft is to be reversed, said air pipe leading into the compartment 19 of the cooler at 52.

Having thus described my invention, what I claim as new and desire to secure by Letters Patent, is:—

1. In a gas producer, the combination of a generator, a cooler, a scrubber and purifier, said cooler scrubber and purifier being arranged to successively treat the gas produced by the generator, an exhauster having a pipe connection with the purifier, and a separate valved up-draft pipe connection leading from the exhauster to the generator, whereby the draft may be reversed without stopping or reversing the exhauster.

2. In a gas producer, the combination of a generator, a cooler, a scrubber and purifier, said cooler scrubber and purifier being arranged to successively treat the gas produced by the generator, an exhauster having a pipe connection with the purifier, a separate valved up-draft pipe connection leading from the exhauster to the generator, whereby the draft may be reversed without stopping or reversing the exhauster, a water-seal for the generator, and drainage water-seals for the cooler and for the scrubber.

In testimony whereof, I hereunto affix my signature in presence of two witnesses.

GUSTAF AKERLUND.

Witnesses:
CHARLTON G. OGBURN,
E. L. GIBBS.